T. R. MAXWELL.
KNOCKDOWN BIRD CAGE.
APPLICATION FILED AUG. 14, 1916.
1,227,814.
Patented May 29, 1917.
2 SHEETS—SHEET 1.
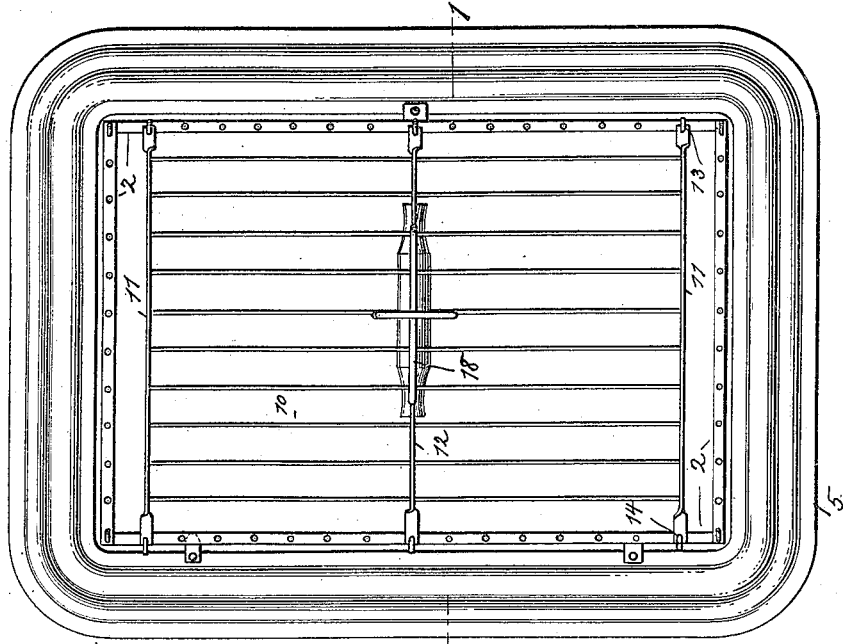
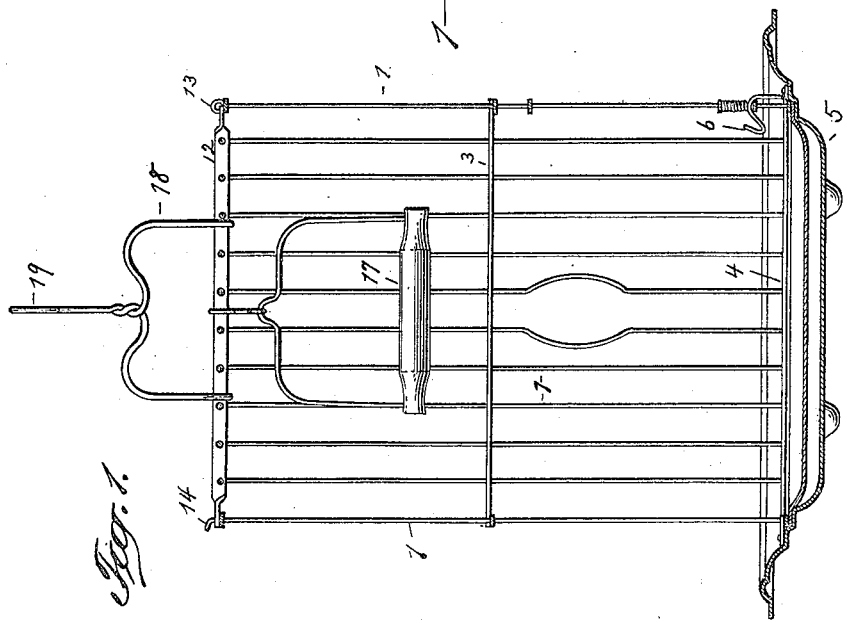
Inventor
Theodore R. Maxwell
By his Attorney T. R. MAXWELL.
KNOCKDOWN BIRD CAGE.
APPLICATION FILED AUG. 14, 1916.
1,227,814.
Patented May 29, 1917.
2 SHEETS—SHEET 2.
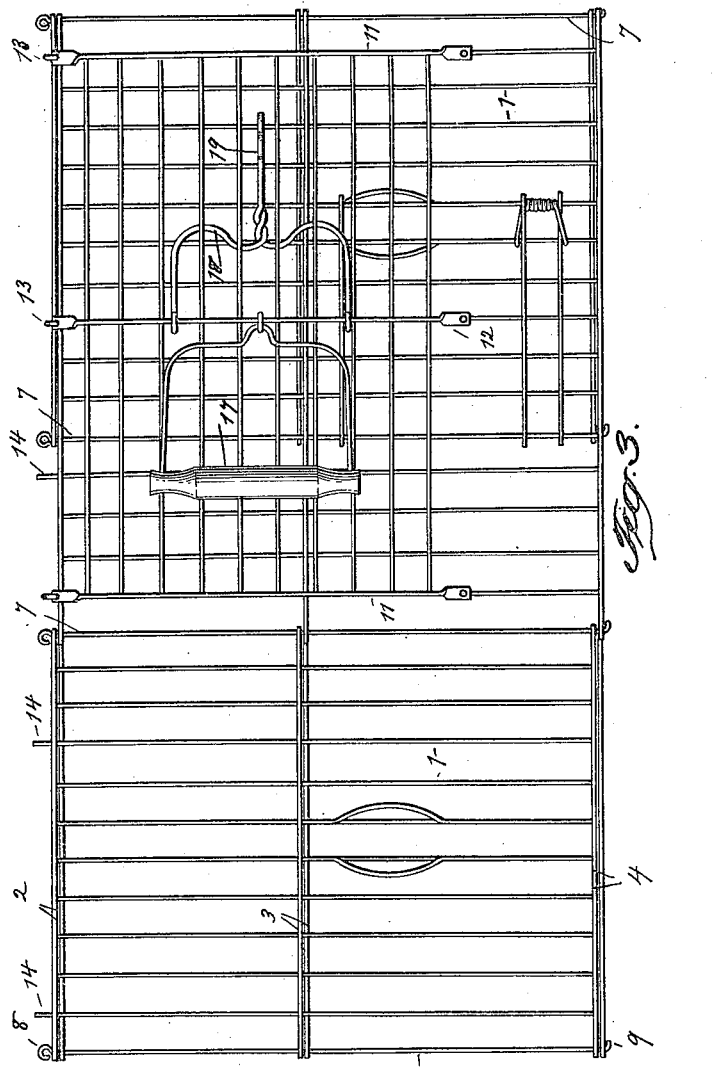
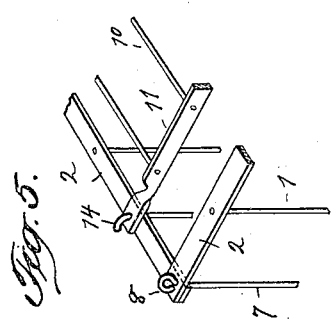
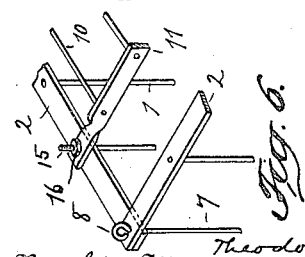
Inventor
Theodore R. Maxwell
By his Attorney

UNITED STATES PATENT OFFICE.

THEODORE R. MAXWELL, OF BROOKLYN, NEW YORK.

KNOCKDOWN BIRD-CAGE.

1,227,814.

Specification of Letters Patent.

Patented May 29, 1917.

Application filed August 14, 1916. Serial No. 114,679.

*To all whom it may concern:*

Be it known that I, THEODORE R. MAXWELL, a citizen of the United States, and a resident of Brooklyn, in the county of Kings and State of New York, have invented certain new and useful Improvements in Knockdown Bird-Cages, of which the following is a specification.

This invention relates to a bird cage of novel construction which may be readily folded so as to occupy a minimum amount of space during portage or storage.

In the accompanying drawing:

Figure 1 is a vertical cross section on line 1—1, Fig. 2 of a bird cage embodying my invention;

Fig. 2, a plan;

Fig. 3, a side view of the cage, showing it folded;

Fig. 4, a bottom plan of Fig. 3;

Fig. 5, a detail of the cage top fastening means, and

Fig. 6, a detail of a modification.

The cage which is adapted to house birds or other animals, is of conventional form, being composed of two side pieces, two end pieces, a top, and a bottom. The side pieces and end pieces are each composed of a plurality of upright rods 1, connected to each other by an upper horizontal rail 2, a central horizontal rail 3, and a lower horizontal rail 4, while the bottom 5 is removably secured to the lower rails 4 by hooks 6 as usual. The four corner rods 7 of the cage which are common to the sides and ends, are not rigidly connected to the horizontal rails (as are the other rods) but pass loosely through perforations of the rails, so that the corner rods assume the additional function of pivots upon which the cage may be folded, so that one of the sides and ends may lie flat against the other side and end. As shown, the upper ends of the corner rods are looped above rail 2 as at 8 while their lower ends are upset below rail 4 as at 9 by which construction, the parts may be readily assembled.

The bottom 5 of the cage is made solid and projects a distance beyond the hinged side and end pieces so that the latter are positively supported upon the bottom, and are by the hooks 6, locked in proper angular relation to each other.

The top of the cage is likewise composed of a plurality of rods 10, connected to each other by side rails 11, and a central rail 12. Means are provided for foldably securing the top to the body of the cage, to which end those rods 1, of one of the side pieces which are in alinement with rails 11, 12 are extended a distance above the top rail 2, and are here formed into loops 13, that hingedly engage the apertured ends of rails 11, 12. The opposite or free ends of said rails may be interlocked with the second side piece, to which end the corresponding rods of the latter are likewise extended a distance above top rail 2. These protruding ends 14 may be passed through apertures formed at the free ends of rails 11, 12 so that the latter come to rest on the top rail 2 of said second side piece, after which ends 14 are upset (Fig. 5) so as to rigidly connect the parts. In lieu of upsetting the ends 14, the latter may be threaded as at 15 to receive nuts 16 (Fig. 6) that hold down rails 11, 12. So also instead of hinging the top, the latter may be removably secured to both side pieces of the cage, in which case the construction shown in Figs. 5 or 6 may be duplicated so as to apply to both sides of the top.

From the central rail 12 of the top, depends the usual swing 17 while a handle 18, is hingedly secured to said rail. The suspending loop of the handle is twisted to stand off at right angles to the body thereof, and this loop is provided at each side with a contraction or lobe 19, the width of which is somewhat less than the clearance between a pair of rods 1.

To knock down the cage, the bottom is removed, the top is unhooked, the body of the cage is folded into the shape of a flat parallelepiped, the top is folded against one of the sides, the handle which is thus interposed between such top and side, being folded against the top, so that one of its lobes enters transversely between a pair of bars of said side, while the other lobe enters longitudinally between a pair of bars of the top. In this way, all of the parts will lie closely against each other, so that the cage will occupy a minimum amount of space.

I claim:

1. A knock-down bird cage comprising side pieces having upright rods and upper horizontal connecting rails, corresponding end pieces hinged to the side pieces, some of the upright rods protruding at their ends above the upper horizontal rails, a top having a plurality of rods, and rails connecting said rods, said last named rails having apertured ends that are adapted to be projected over the protruding ends of the upright rods, into engagement with the upper horizontal rail of one of the side pieces.

2. A knock down bird cage comprising side pieces having connected upright rods, end pieces having connected upright rods, and hinged to the side pieces, a top pivoted to one of the side pieces, and a handle pivoted to the top and having a lobe adapted to be projected transversely between the rods of said side piece.

THEODORE R. MAXWELL.

Copies of this patent may be obtained for five cents each, by addressing the "Commissioner of Patents, Washington, D. C."